United States Patent

Seidel

[15] 3,650,503
[45] Mar. 21, 1972

[54] TILT-AND-ROTATE BRACKET ASSEMBLY

[72] Inventor: Kendall R. Seidel, 4521 Cambury Drive, La Palma, Calif. 90620

[22] Filed: May 28, 1970

[21] Appl. No.: 41,449

[52] U.S. Cl. ............................................. 248/285, 248/299
[51] Int. Cl. ............................................. F16m 13/00
[58] Field of Search .................... 248/40, 42, 183, 278, 279, 248/299; 306/10; 269/72

[56] References Cited

UNITED STATES PATENTS

| 1,278,318 | 9/1918 | Edsall | 248/299 X |
| 3,211,406 | 10/1965 | Averett | 248/299 X |
| 1,158,856 | 11/1915 | Rohrbach | 306/10 |
| 1,132,658 | 3/1915 | Harrison | 306/10 |

*Primary Examiner*—William H. Schultz
*Attorney*—Allan M. Shapiro

[57] ABSTRACT

Mounting assembly for the mounting of devices which must be directed or oriented and then securely locked into position. Examples of such structures are flood-lighting fixtures and closed circuit TV monitor cameras in places of business. An annular base ring is arranged for securement by any convenient means. An annular arcuate swivel having a right cylindrical outer circumference rests upon the base ring to provide movability about the axis of the ring and about the axis of the swivel. The device being mounted is carried on the swivel. Clamping means engages below the base ring and over the swivel to clamp the two together to secure alignment when positioning is obtained.

7 Claims, 5 Drawing Figures

Patented March 21, 1972
3,650,503
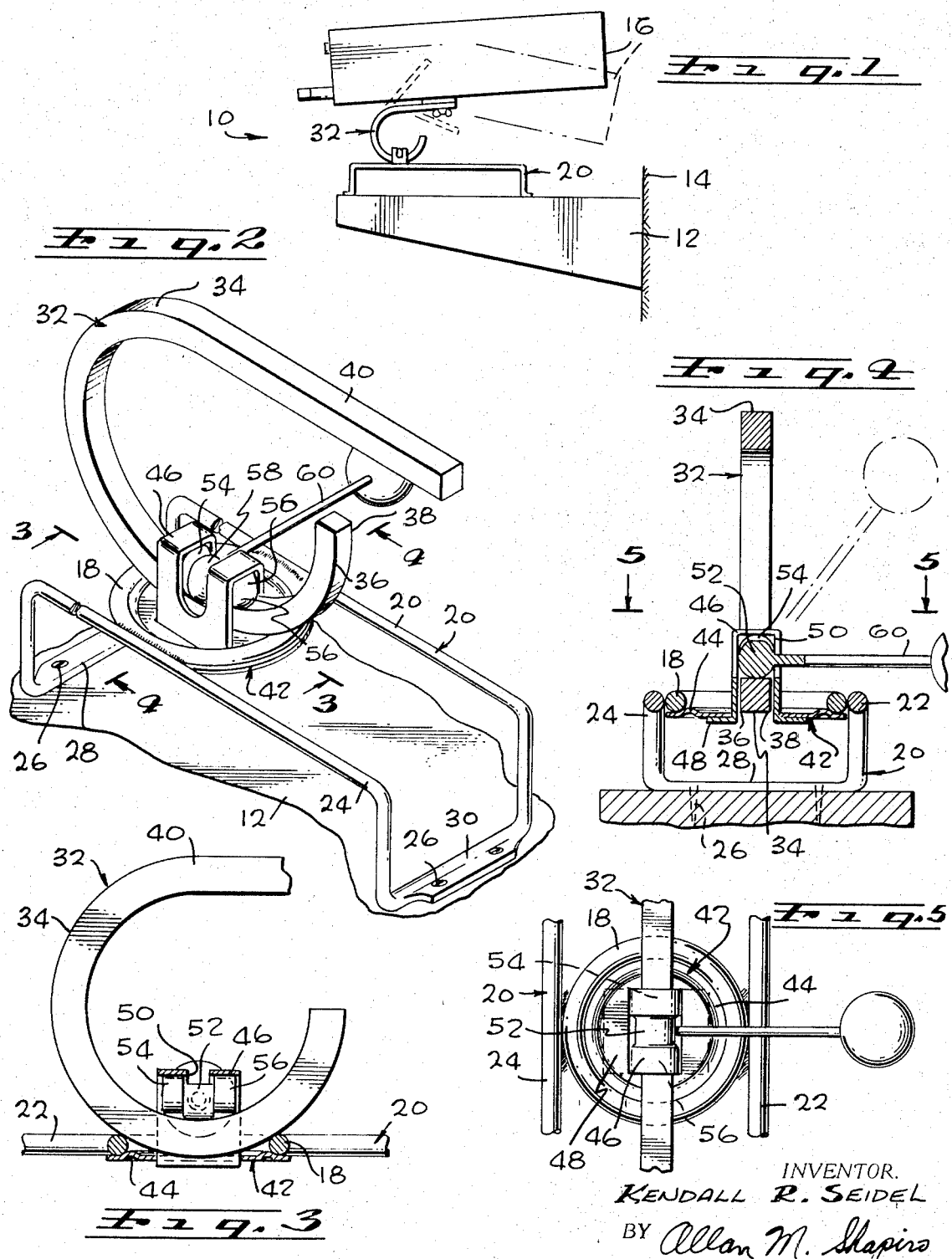
INVENTOR.
KENDALL R. SEIDEL
BY Allan M. Shapiro
ATTORNEY

TILT-AND-ROTATE BRACKET ASSEMBLY

BACKGROUND OF THE INVENTION

1. Field of the Invention

This invention is directed to a tilt-and-rotate bracket mount assembly which has a base ring for defining rotation on an azimuthal axis and a swivel for defining rotation on an elevational axis in an arcuate path, both rotational members being lockable together with a clamp for securement.

2. Description of the Prior Art

Universal mounting of structures is often a desirable or necessary goal. The most universal and flexible of all mountings is the ball and socket joint which permits motion around a spherical center. However, because of the necessity for structural support of the interior ball and, in most cases, the need to prevent the socket from leaving the ball, the limit of motion is normally in a solid cone angle of less than 180°. Such motion is often sufficient and the versatility of spherical adjustment about the ball center is a sufficient advantage to outweight the problem of limited angular motion.

On the other hand, such ball joints are difficult to clamp. When the loads are light, balls of small diameter suffice for structural support purposes. However, larger balls are often necessary simply to provide the adequacy of clamping, once the adjustment point has been reached. Balls must be very much larger than required for mere structural support if rigid clamping is to be assured.

On the other hand, some structures do not need adjustability in as many directions as a ball joint provides. Some structures should remain upright, while others do not have any need for some motions. For example, a flood-light does not need adjustability on more than azimutal and elevational angles in order to direct it where desired. More adjustment than that, for example, on an axis normal to both the elevational and azimuthal axes, merely makes the device more difficult to adjust and lock when the desired position is finally reached.

This is also true of structures such as camera supports where an upright position is desired. Many camera supports, usually called panheads, have both azimuthal and elevational camera adjustment. However, since these are usually designed for movement while picture taking is going on, movement must be smooth. Thus, a complex bearing structure with appropriate locks is necessary. The locks must function smoothly, and the camera must swing smoothly upon its axes when not locked. Such structures are necessarily more complex and expensive than those which require mere orientation and locking before the device mounted thereon is put in use.

SUMMARY OF THE INVENTION

In order to aid in the understanding of this invention, it can be stated in essentially summary form that it is directed to a tilt-and-rotate bracket mount assembly wherein the mounted device is movable on both tilt and rotate axes, corresponding to elevational and azimuthal rotation, together with locking on both rotational axes when the desired mounting position is reached. The assembly comprises a base ring which has a generally upwardly and inwardly directed surface of revolution about the annular axis which corresponds to the azimuthal axis. Mounted on the base ring is a swivel which is also an annular surface of revolution, this time about the elevational axis. The swivel has an exterior, outer surface which is of such nature as to contact the base ring on its surface at two points in the forward portion of the ring and two points in the rearward. Between the contact points, a clamp is provided to clamp the swivel to the ring, thus to provide four-point contact for positive positional locking.

Accordingly, it is an object of this invention to provide a tilt-and-rotate bracket mount assembly. It is another object to provide a bracket mount assembly which has adjustability on a tilt axis and adjustability upon a rotational axis to provide both elevational and azimuthal adjustability to a device mounted upon the assembly. It is a further object to provide a bracket mount assembly wherein there is no adjustability on an axis which is normal to both the elevational and azimuthal axes in order to minimize difficulty in properly positioning the device mounted on the bracket. It is a further object to provide a bracket mount assembly wherein a device mounted on the bracket may be both azimuthally and elevationally adjusted and thereafter clamped, so that the clamped bracket holds the device in the desired orientation. It is yet another object to provide a bracket mount assembly which comprises a ring mounted around the azimuthal axis and a swivel mounted around the elevational axis with the swivel in direct engagement with the ring so that motion therebetween provides motion on both axes and clamping therebetween locks the bracket mount assembly in both axes. It is a further object to provide a cam-lock clamping device as a part of the bracket mount assembly which clamps the swivel to the ring.

The features of the present invention which are believed to be novel are set forth with particularity in the appended claims. The present invention, both as to its organization and manner of operation, together with further objects and advantages thereof, may be understood best by reference to the following description, taken in connection with the accompanying drawings.

BRIEF DESCRIPTION OF THE DRAWINGS

FIG. 1 is a side elevational view of the tilt-and-rotate bracket mount assembly of this invention, showing the assembly carrying a device to be positioned and being mounted upon a wall.

FIG. 2 is an enlarged perspective view, with parts broken away, of the assembly of this invention.

FIG. 3 is a sectional view, taken generally along line 3—3 of FIG. 2, showing the swivel in side elevation.

FIG. 4 is a sectional view, taken generally along line 4—4 of FIG. 2, showing the swivel in end elevation.

FIG. 5 is a top plan view, with parts broken away, seen along line 5—5 of FIG. 4.

DESCRIPTION OF THE PREFERRED EMBODIMENT

FIG. 1 illustrates the tilt-and-rotate bracket mount assembly 10 as being mounted upon an arm 12 which extends from a wall 14. This is merely representative of a conventional mounting upon a solid structure. The assembly 10 is preferably and most conveniently mounted upon the horizontal surface of the top of the arm 12 but, again, this is merely representative of the majority of uses of the assembly 10. The top surface of wall-mounted arm 12 may be in any orientation suitable and convenient for the intended uses of the assembly 10.

Assembly 10 is illustrated as carrying a TV camera 16 or a like structure. Such illustration of the invention is employed because the assembly 10 is particularly useful for the mounting of such devices, particularly in fixed positions, such as in continuous monitoring in banks and stores. The TV camera 16 is illustrative since the assembly 10 can be employed to carry any device for which directional adjustment and locking is desired while maintaining the device in an upright position.

Base ring 18 is the basic fixed portion of the adjustment mechanism. Base ring 18 is mounted upon base support 20 by any convenient, strong supporting means, such as by welding. Base support 20 is comprised of parallel rods 22 and 24, which are bent down at their ends and secured to the top surface of arm 12, as by screws 26 extending downward through connecting flanges 28 and 30. These rods and flanges serve to hold the bottom of base ring 18 spaced above the top of arm 12. Any convenient or conventional supporting means for base ring 18 can be employed that provides for space below the ring, for the clamping mechanism hereinafter described.

Base ring 18 is formed as an annular surface of revolution around an upright rotational axis or azimuthal axis. While many surfaces of revolution will be operative, one having a circular cross section, as illustrated in FIG. 4, is preferable.

Swivel 32 is also of annular form, with its surfaces being surfaces of revolution about a tilt or elevational axis. This axis is preferably at right angles to and intersects with the upright azimuthal axis. Swivel 32 can be any convenient annular structure of revolution but, in accordance with this invention, it must have a cylindrical or substantially cylindrical outer surface 34. The reason for this is that such a cylindrical outer surface 34 provides two corners 36 and 38 which engage with the surface of base ring 18, as is especially well seen in FIG. 3. Since both of the surfaces are annular surfaces of revolution and the outer surface 34 is substantially cylindrical, the contact between the swivel corners 36 and 38 and the surface of the base ring comprise four virtual point contacts. These four virtual point contacts are the structure that is desired and it is with these point contacts in mind that the cross-sectional shape of base ring 18 and swivel 32 are defined. Thus, the cross section of swivel 32 is such that the outer surface 34 must be cylindrical, or very close to it, and the structure is preferably rectangular in cross section or specifically square for the convenient use of materials.

The partial annular curvature of swivel 32 is such as to permit a maximum amount of elevation adjustment. As seen in FIG. 1, the amount of elevational adjustment approaches 270° and is limited by the shape of the TV camera 16, rather than the extent of swivel 32. As seen in FIG. 3, only one quadrant of a complete annulus is missing so that a full 270° of elevational adjustment is obtainable.

The curved bar which forms swivel 32 extends rearward beyond the definition of the annulus to mounting section 40. As seen in FIG. 1, the device 16 is mounted on this mounting section by any convenient means, such as a bolt therethrough secured by a thumb nut, or any other convenient securement means. The mounting section can have any device welded or clamped thereto suitable for mounting TV camera 16 or other structure thereon.

It is clear that, when not clamped, swivel 32 can rotate upon base ring 18 upon either or both of the azimuthal or elevational axes. Either one of these motions causes relative motion between the swivel and the base ring, specifically to obtain different point contact between the corners of the swivel on the ring. In order to provide clamping once position is obtained, a clamp is provided.

Clamp disc 42 is circular and is positioned under base ring 18. It has circular rib 44 extending upwardly therefrom, just interiorly of base ring 18, to serve to center the clamp disc with respect to the base ring. Clamp housing 46 is rectangular in structure and extends upward through a rectangular central opening in clamp disc 42. As is seen in FIGS. 3, 4 and 5, flanges 48 extend outward from the opening underneath clamp housing 46. As is seen in FIG. 4, a portion of the swivel 32 lying centrally of base ring 18 is embraced by clamp housing 46.

Slot 50 is formed across the top of clamp housing 46. Cam shaft 52 lies within the clamp housing between the upper walls of the clamp housing which are divided by slot 50 and the top of swivel 32. Cam shaft 52 has upper cams 54 and 56 and lower cam 58 thereon. Handle 60 is secured to lower cam 58 and extends out through slot 50.

The orientation of the cams on the cam shaft is such that, when the handle 60 is moved from the dotted line to the full line position of FIG. 4, the upper cams 54 and 56 engage and press under the top of the clamp housing to raise clamp disc 42 under base ring 18, while lower cam 58 presses down on the swivel 32 to firmly lock it against base ring 18. The clamping load goes through the small, virtual point areas of contact to provide high stress levels. These high stress levels provide tight clamping to lock the swivel with respect to the base ring. These high stress levels are accomplished through the engagement of the four contact points between the two surfaces of revolution, so that ease of clamping and locking is accomplished.

The tilt-and-rotate bracket mount assembly is used by mounting it upon an appropriate structure, such as arm 12, and the attachment of the device to be adjusted, for example, TV camera 16, to the mounting section. With clamp handle 60 in the raised position, swivel 32 is rotated about its own elevational axis and is rotated about the azimuthal axis of base ring 18 until the device is directed in the desired orientation. During this adjustment while unclamped, the freedom within the clamp is such that there is very limited side sway of the swivel. It cannot fall over on its side because of the four-point engagement of the swivel with the base ring.

It can be appreciated from FIGS. 3 and 4 that, with the clamp handle in the raised position, there is very limited amount of freedom to the swivel and the base ring to prevent substantial side sway of the swivel. In other words, the swivel is constrained to motion substantially only about the two axes. When the device is oriented in the desired position, the clamp handle 60 is swung down to lock the swivel into high stress, four-point engagement against the base ring. In view of the fact that the front and rear contact points are well spaced from each other, there is a large moment arm so that resistance to motion is accomplished. Unclamping permits quick and convenient readjustment.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A bracket mount assembly for the mounting of a device for direction of the device upon azimuthal and elevational axes to orient the device and for locking the device in its oriented position, comprising:
   an annular base ring having an upwardly and inwardly directed surface of revolution around an azimuthal axis;
   a swivel having an exterior surface formed as a surface of revolution about an elevational axis, said elevational axis substantially intersecting said azimuthal axis substantially at right angles thereto, said surface of revolution on said swivel extending at least a half circumference to permit swivel revolution about said elevational axis, said surface having first and second corners, said corners each engaging said base ring on each side of said azimuthal axis;
   mounting means for mounting a device on said swivel; and
   clamping means for clamping said swivel to said base ring to engage said corners on said swivel with said surface of revolution on said base ring, said clamping means comprising:
   a clamp disc positioned below said base ring and a cam shaft positioned above said swivel; and
   a clamp housing engaging said clamp disc and said cam shaft so that rotation of said cam shaft causes clamping of said swivel against said base ring.

2. The assembly of claim 1 wherein:
   said clamp housing embraces said swivel; and
   said cam shaft has upper cams engaging said clamp housing and a central lower cam engaging said swivel.

3. The assembly of claim 2 wherein:
   said base ring is an annular ring of substantially circular section.

4. The assembly of claim 2 wherein:
   said surface of revolution on said swivel is a right cylindrical surface about said elevational axis.

5. The assembly of claim 4 wherein:
   said swivel is annular about said elevational axis and has a substantially rectangular cross section.

6. The assembly of claim 5 wherein:
   said swivel has a substantially square cross section so that the outer corners of said square engage with said base ring.

7. The assembly of claim 5 wherein said swivel comprises:
   a rectangular bar annularly shaped through substantially three quadrants, and having a mounting section extending tangentially away from said curved annular portion, said mounting section being adapted for the carrying of a device.

* * * * *